No. 871,254. PATENTED NOV. 19, 1907.
G. BENJAMIN.
COLLAPSIBLE TABLE.
APPLICATION FILED OCT. 24, 1906.

WITNESSES: INVENTOR.
George Benjamin
BY
Charles N. Butler
ATTORNEY.

UNITED STATES PATENT OFFICE.

GEORGE BENJAMIN, OF PHILADELPHIA, PENNSYLVANIA, ASSIGNOR OF ONE-HALF TO FRANCES A. TYGERT, OF PHILADELPHIA, PENNSYLVANIA.

COLLAPSIBLE TABLE.

No. 871,254.        Specification of Letters Patent.        Patented Nov. 19, 1907.

Application filed October 24, 1906. Serial No. 340,262.

*To all whom it may concern:*

Be it known that I, GEORGE BENJAMIN, a citizen of the United States, residing in the city of Philadelphia, county of Philadelphia, and State of Pennsylvania, have invented certain Improvements in Collapsible Tables, of which the following is a specification.

This invention is an improved collapsible table such that the parts thereof can be assembled or disassociated and folded into compact form very readily, in a construction that is simple, efficient and economical.

Figures 1, 2:
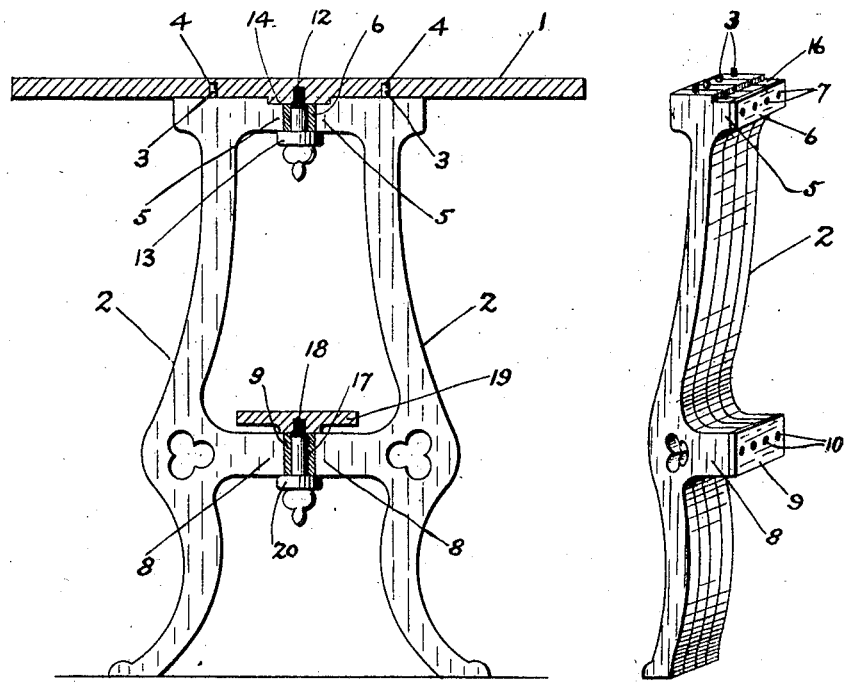
Figure 3:
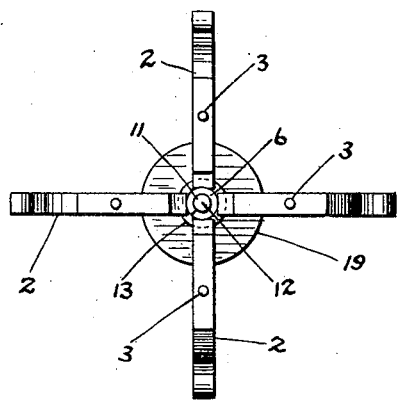

In the accompanying drawings, Figure 1 represents a sectional side elevation of a form of table embodying my improvements; Fig. 2 is a perspective view of the legs in their separate and folded relation, and Fig. 3 is a top plan view of the legs in operative position with the top removed.

As shown in the drawings, the invention comprises the table top 1 and the legs 2. In the top of each leg is a dowel pin 3 and in the table top are the sockets 4, which receive the dowel pins and space the legs equidistantly. Similar projections 5 are connected together, suitably by means of a flexible strap 6 and nails or screws 7 passing therethrough into the projections, and in like manner similar body projections 8 on the legs are connected together, suitably by means of a flexible strap 9 and nails or screws 10, the legs being thus hinged together so that they can be folded, held together and handled in parallel relation as shown in Fig. 2, or brought to the operative position shown in Fig. 3 very readily. The strap 6 forms a socket 11, when the legs are brought to the operative position, and through this socket is passed a screw 12 into the table top, a flange 13 on the screw clamping the leg projections 5, and the disk 14 secured to the under side of the top and fitting in the seats 16 of the projections reinforces the construction. In a like manner, upon bringing the legs to the operative position, the strap 9 forms a socket 17, and the screw 18 passes through the socket into the member 19, a flange 20 on the screw with the member 19 engaging the projections 8, by which they are clamped together. By merely withdrawing the screws 12 and 18 the top can be removed and the legs folded, the latter being held together at all times by the straps or hinges so that they can be handled most conveniently.

It will be understood that the construction is operative and serviceable without the body connections comprising the projections 8 and the parts for holding them together, and in small and inexpensive types of tables it is the object to use but a single strap or set of hinges and connections for the legs.

Having described my invention, I claim:—

1. A collapsible table comprising a plurality of legs having top and body projections thereon, said projections being radially disposed in the assembled position of said legs, a flexible strap fixed to each of said top projections, and a flexible strap fixed to each of said body projections, said straps forming sockets in the assembled position of said legs, a top supported by said legs a screw disposed in the socket formed by said strap connecting the top projections, said screw clamping said top projections to said table top, a screw disposed in the socket formed by the strap connecting the body projections, and means coöperating with said screw for clamping said body projections together.

2. A collapsible table comprising a plurality of legs having inwardly extending projections near their upper ends, and hinged together at their inner edges, in combination with a top having a projecting member on the under side thereof, said member being adapted to rest on the upper edges of said projections when the legs are extended horizontally at an angle to each other, and a screw engaging in said member and having a flange for engaging said projections to clamp the legs to the top.

3. A collapsible table comprising a plurality of legs having inwardly extending projections hinged together at their inner edges so that when the legs are extended they form a socket with the legs disposed radially thereto, a top having a portion which rests on the upper edges of said projections, and a clamp screw having a flange which engages said projections, and a stem which passes through said socket and is threaded into said top portion, whereby said projections are clamped between said top and flange to connect the legs to the top.

In testimony whereof I have hereunto set my name this 9th day of October, 1906, in the presence of the subscribing witnesses.

GEORGE BENJAMIN.

Witnesses:
    JAS. G. DEMY, Jr.,
    ROBERT JAMES EARLEY.